United States Patent
Winkle et al.

(10) Patent No.: US 11,822,343 B2
(45) Date of Patent: Nov. 21, 2023

(54) SYSTEMS AND METHODS FOR CONTROLLING COMMUNICATION CAPABILITIES OF UNMANNED VEHICLES VIA INTERMEDIATE COMMUNICATION DEVICES

(71) Applicant: Walmart Apollo, LLC, Bentonville, AR (US)

(72) Inventors: David C. Winkle, Leesburg, FL (US); John J. O'Brien, Bella Vista, AR (US); Robert L. Cantrell, Herndon, VA (US)

(73) Assignee: Walmart Apollo, LLC, Bentonville, AR (US)

( * ) Notice: Subject to any disclaimer, the term of this patent is extended or adjusted under 35 U.S.C. 154(b) by 144 days.

(21) Appl. No.: 17/328,777

(22) Filed: May 24, 2021

(65) Prior Publication Data

US 2021/0278862 A1 Sep. 9, 2021

Related U.S. Application Data

(63) Continuation of application No. 16/270,901, filed on Feb. 8, 2019, now abandoned.

(Continued)

(51) Int. Cl.
*G05D 1/02* (2020.01)
*G05D 1/10* (2006.01)
(Continued)

(52) U.S. Cl.
CPC ......... *G05D 1/0276* (2013.01); *G05D 1/0202* (2013.01); *G05D 1/0214* (2013.01);
(Continued)

(58) Field of Classification Search
CPC .. G05D 1/0276; G05D 1/0202; G05D 1/0214; G05D 1/0287; G05D 1/101; H04W 4/40; H04W 40/22; G01C 21/3691
See application file for complete search history.

(56) References Cited

U.S. PATENT DOCUMENTS 9,479,964 B2 10/2016 Jalali
9,494,937 B2 11/2016 Siegel
(Continued)

FOREIGN PATENT DOCUMENTS

| JP | 2007174564 A | * | 7/2007 |
|---|---|---|---|
| JP | 2011215720 A | * | 10/2011 |
| WO | 2019190644 | | 10/2019 |

OTHER PUBLICATIONS

Machine Translation of JP2011215720A (Year: 2011).*
(Continued)

*Primary Examiner* — Faris S Almatrahi
*Assistant Examiner* — Sahar Motazedi
(74) *Attorney, Agent, or Firm* — Fitch, Even, Tabin & Flannery, LLP

(57) ABSTRACT

In some embodiments, methods and systems are provided that provide for monitoring and controlling communication capabilities of unmanned transport vehicles that via one or more intermediate communication devices that provide relay communications between the unmanned transport vehicles and a control station device when the unmanned transport vehicles travel through areas where the network quality does not permit direct communication between the unmanned transport vehicles and the control station device.

20 Claims, 4 Drawing Sheets

Related U.S. Application Data

(60) Provisional application No. 62/650,509, filed on Mar. 30, 2018.

(51) Int. Cl.
    *H04W 4/40*    (2018.01)
    *H04W 40/22*   (2009.01)
    *G01C 21/36*   (2006.01)

(52) U.S. Cl.
    CPC ........... *G05D 1/0287* (2013.01); *G05D 1/101* (2013.01); *H04W 4/40* (2018.02); *H04W 40/22* (2013.01); *G01C 21/3691* (2013.01)

(56) References Cited

U.S. PATENT DOCUMENTS

| | | |
|---|---|---|
| 9,552,736 B2    | 1/2017  | Taveira |
| 9,668,146 B2    | 5/2017  | Lau |
| 2016/0239803 A1 | 8/2016  | Borley |
| 2016/0285864 A1 | 9/2016  | Canavor |
| 2016/0309337 A1 | 10/2016 | Priest |
| 2017/0012697 A1 | 1/2017  | Gong |
| 2017/0178222 A1 | 6/2017  | High |
| 2017/0313421 A1 | 11/2017 | Gil |
| 2018/0359626 A1 | 12/2018 | Benoliel |
| 2019/0302798 A1 | 10/2019 | Winkle |

OTHER PUBLICATIONS

Machine Translation of JP2007174564A (Year: 2007).*
Corrigan, Fintan; "Prevent Phantom GPS Signal Loss and Failsafe Mode Tips"; https:// www.dronezon.com/diy-drone-repair-videos/dji-innovation-drones/fix-phantom-gps-signal-loss-and-failsafe-mode-tips/; Jan. 27, 2015, pp. 1-7.
Kopeikin, Andrew N.; "Dynamic mission planning for communication control in multiple unmanned aircraft teams"; http://hdl.handle.net/1721.1/76105 ; Jun. 2012, pp. 1-160.
PCT; App. No. PCT/US2019/017417; International Preliminary Report on Patentability dated Oct. 15, 2020.
PCT; App. No. PCT/US2019/017417; International Search Report and Written Opinion dated May 1, 2019.
U.S. Appl. No. 16/270,901; Notice of Allowance dated Mar. 10, 2021; (pp. 1-19).
U.S. Appl. No. 16/270,901; Office Action dated Jan. 13, 2021; (pp. 1-21).

\* cited by examiner

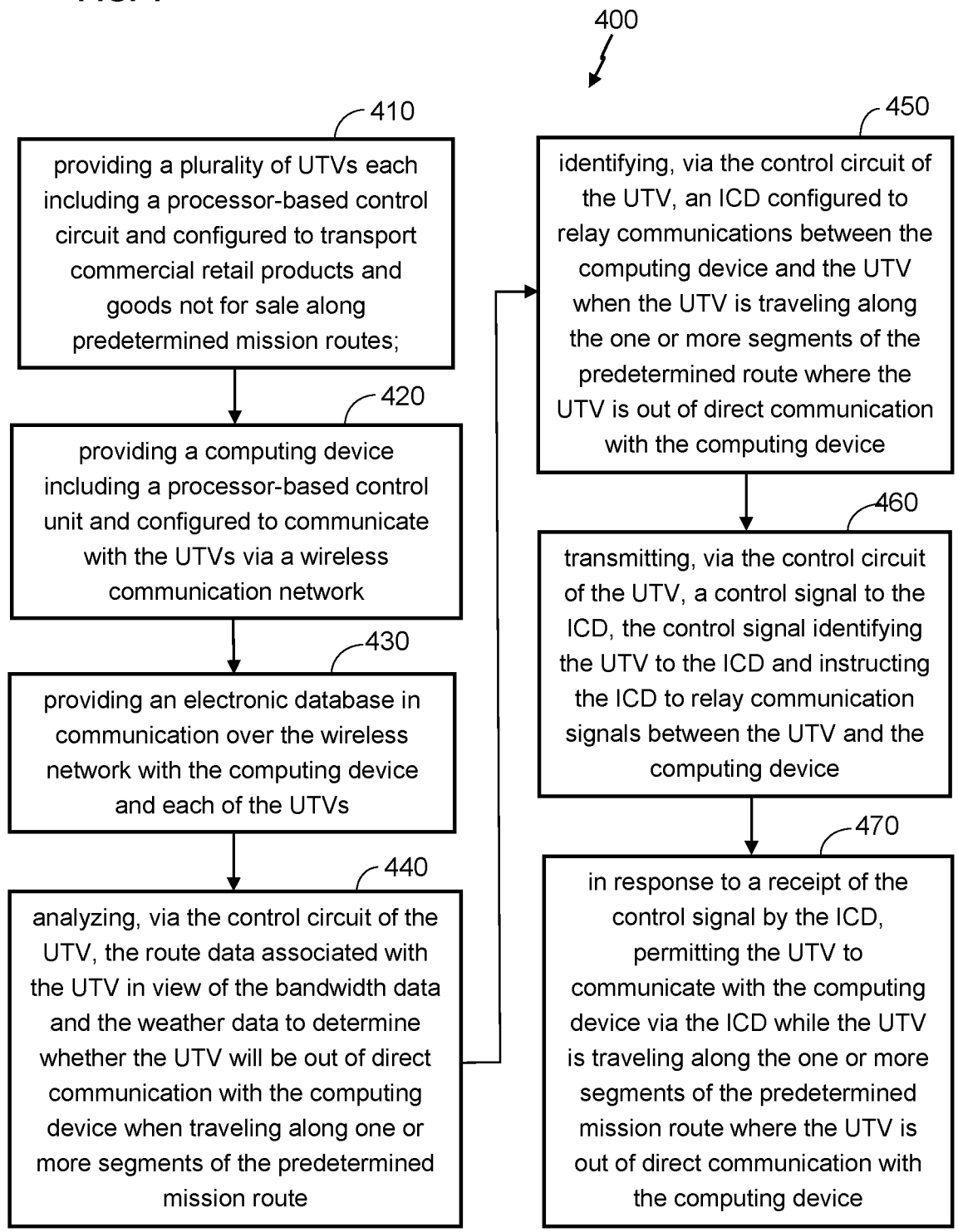

SYSTEMS AND METHODS FOR CONTROLLING COMMUNICATION CAPABILITIES OF UNMANNED VEHICLES VIA INTERMEDIATE COMMUNICATION DEVICES

CROSS-REFERENCE TO RELATED APPLICATIONS

This application is a continuation of U.S. application Ser. No. 16/270,901, filed Feb. 8, 2019, which claims the benefit of U.S. Provisional Application No. 62/650,509, filed Mar. 30, 2018, each of which is incorporated herein by reference in its entirety.

TECHNICAL FIELD

This disclosure relates generally to monitoring and controlling communication capabilities of unmanned vehicles and, in particular, to ensuring continuous communication capabilities of unmanned transport vehicles via intermediate communication devices.

BACKGROUND

The concept of product delivery using unmanned aerial and/or ground vehicles is becoming popular. Such unmanned vehicles would be expected to deliver products over wide geographic areas while being monitored and/or controlled by one or more computing devices at a control station. Generally, various factors may affect the communication signals transmitted to/transmitted by an unmanned vehicle as it travels along its delivery route. For example, weather, bandwidth congestion, and distance from the central station are just some of the factors that may cause degradation of the wireless communication signals between the control station and the unmanned vehicle. This may, in some instances, lead to situations where the control station and the unmanned vehicle would be unable to communicate with each other, which is undesirable.

BRIEF DESCRIPTION OF THE DRAWINGS

Disclosed herein are embodiments of systems, apparatuses, and methods for monitoring and controlling communication capabilities of unmanned transport vehicles. This description includes drawings, wherein:

FIG. 4 is a flow chart diagram of a process of monitoring and controlling communication capabilities of unmanned transport vehicles in accordance with some embodiments.

Figure 1:
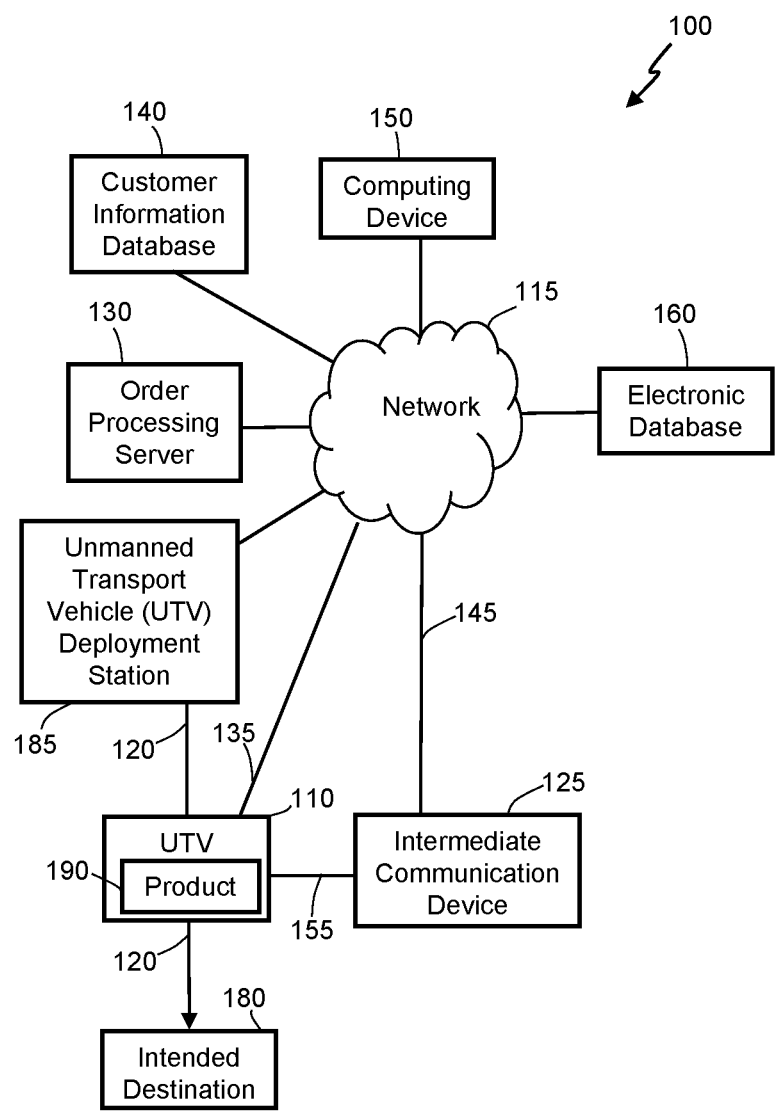
FIG. 1 is a diagram of a system for monitoring and controlling communication capabilities of unmanned transport vehicles in accordance with some embodiments.

Elements in the figures are illustrated for simplicity and clarity and have not been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

The following description is not to be taken in a limiting sense, but is made merely for the purpose of describing the general principles of exemplary embodiments. Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Generally, the systems, devices, and methods described herein relate to controlling and monitoring communication capabilities of unmanned transport vehicles and ensuring that the unmanned transport vehicles are capable of continuous and uninterrupted communication with a computing device of a control station via an intermediate communication device.

In some embodiments, a system for monitoring and controlling communication capabilities a plurality of unmanned vehicles includes: a plurality of unmanned vehicles each including a processor-based control circuit and configured to transport commercial retail products and goods not for sale along predetermined mission routes; a computing device including a processor-based control unit and configured to communicate with the unmanned vehicles via a wireless communication network; and an electronic database in communication over the wireless network with the computing device and the at least one of the unmanned vehicles. The electronic database is configured to store data including: route data indicating the predetermined mission routes of the unmanned vehicles; bandwidth data indicating bandwidth available to the unmanned vehicles during their travel along the predetermined mission routes; and weather data indicating predicted weather during the travel of the unmanned vehicles along the predetermined mission routes. The control circuit of at least one of the unmanned vehicles is configured to analyze the route data associated with the unmanned vehicles in view of the bandwidth data and the weather data to determine whether the at least one of the unmanned vehicles will be out of direct communication with the computing device when traveling along one or more segments of the predetermined mission route. The control circuit of at least one of the unmanned vehicles is also configured to, in response to a determination by the control circuit that the at least one of the unmanned vehicles will be out of direct communication with the computing device when traveling along the one or more segments of the predetermined mission route, identify an intermediate communication device configured to relay communications between the computing device and the at least one of the unmanned vehicles when the at least one of the unmanned vehicles is traveling along the one or more segments of the predetermined mission route where the at least one of the unmanned vehicles is out of direct communication with the computing device. The control circuit of at least one of the unmanned vehicles is also configured to transmit a control signal to the intermediate communication device, the control signal identifying the at least one of the unmanned vehicles to the intermediate communication device and instructing the intermediate communication device to relay communication signals between the computing device and the at least one of the unmanned vehicles. The intermediate communication device is configured, in response to a receipt of the control signal transmitted by the at least one of the unmanned vehicles, to relay communication signals between the computing device and the at least one of the unmanned vehicles while the at least one of the unmanned vehicles is traveling along the one or more segments of the predetermined mission route where the at least one of the unmanned vehicles is out of direct communication with the computing device.

In some embodiments, a method for monitoring and controlling communication capabilities a plurality of unmanned vehicles includes: providing a plurality of unmanned vehicles each including a processor-based control circuit and configured to transport commercial retail products and goods not for sale along predetermined mission routes; providing a computing device including a processor-based control unit and configured to communicate with the unmanned vehicles via a wireless communication network; providing an electronic database in communication over the wireless network with the computing device and the at least one of the unmanned vehicles. The electronic database is configured to store data including: route data indicating the predetermined mission routes of the unmanned vehicles; bandwidth data indicating bandwidth available to the unmanned vehicles during their travel along the predetermined mission routes; and weather data indicating predicted weather during the travel of the unmanned vehicles along the predetermined mission routes. The method further includes; analyzing, via the control circuit of the at least one of the unmanned vehicles, the route data associated with the unmanned vehicles in view of the bandwidth data and the weather data to determine whether at least one of the unmanned vehicles will be out of direct communication with the computing device when traveling along one or more segments of the predetermined mission route; in response to a determination by the control circuit of the at least one of the unmanned vehicles that the at least one of the unmanned vehicles will be out of direct communication with the computing device when traveling along the one or more segments of the predetermined mission route, identifying, via the control circuit of the at least one of the unmanned vehicles, an intermediate communication device configured to relay communications between the computing device and the at least one of the unmanned vehicles when the at least one of the unmanned vehicles is traveling along the one or more segments of the predetermined mission route where the at least one of the unmanned vehicles is out of direct communication with the computing device; transmitting, via the control circuit of the at least one of the unmanned vehicles, a control signal to the intermediate communication device, the control signal identifying the at least one of the unmanned vehicles to the intermediate communication device and instructing the intermediate communication device to relay communication signals between the at least one of the unmanned vehicles and the computing device; and in response to a receipt of the control signal by the intermediate communication device, permitting the at least one of the unmanned vehicles to communicate with the computing device via the intermediate communication device while the at least one of the unmanned vehicles is traveling along the one or more segments of the predetermined mission route where the at least one of the unmanned vehicles is out of direct communication with the computing device.

FIG. 1 shows an embodiment of a system 100 for controlling communication capabilities of unmanned vehicles unmanned transport vehicles (UTVs) 110. It will be understood that the details of this example are intended to serve in an illustrative capacity and are not necessarily intended to suggest any limitations in regards to the present teachings. In some aspects, the exemplary UTV 110 of FIG. 1 is configured to transport one or more commercial retail products 190 and/or goods that are not for sale from one or more UTV deployment stations 185 to one or more intended destinations 180 via one or more mission routes 120. In other aspects, the UTV 110 is configured to travel along the mission route 120 from a UTV deployment station 185 to a product pick up location. In yet other aspects, the UTV 110 is configured to travel along the mission route 120 from an intended destination 180 or from a product pick up location back to the UTV deployment station 185.

A customer may be an individual or business entity. An intended destination 180 may be a home, work place, or another location designated by the customer when placing the order or scheduling a product return pick-up. Products 190 that may be delivered via the UTVs 110 of the system 100 may include but are not limited to general-purpose consumer goods (retail products and goods not for sale) and consumable products (e.g., food items, medications, or the like). A UTV deployment station 185 can be mobile (e.g., vehicle-mounted) or stationary (e.g., installed at a facility of a retailer). A retailer may be any entity operating as a brick-and-mortar physical location and/or a website accessible, for example, via an intranet, internet, or another network, by way of which products 190 may be ordered by a consumer for delivery via a UTV 110.

The exemplary system 100 depicted in FIG. 1 includes an order processing server 130 configured to process a purchase order by a customer for one or more products 190. It will be appreciated that the order processing server 130 is an optional component of the system 100, and that some embodiments of the system 100 are implemented without incorporating the order processing server 130. The order processing server 130 may be implemented as one server at one location, or as multiple interconnected servers stored at multiple locations operated by the retailer, or for the retailer. As described in more detail below, the order processing server 130 may communicate with one or more electronic devices of system 100 via a network 115. The network 115 may be a wide-area network (WAN), a local area network (LAN), a personal area network (PAN), a wireless local area network (WLAN), Wi-Fi, LTE, universal mobile telecommunications system (UMTS), differential global positioning system (DGPS), Zigbee, Bluetooth, or any other internet or intranet network, or combinations of such networks. Generally, communication between various electronic devices of system 100 may take place over hard-wired, cellular, Wi-Fi or Bluetooth networked components or the like. In some embodiments, one or more electronic devices of system 100 may include cloud-based features, such as cloud-based memory storage.

In the embodiment of FIG. 1, the order processing server 130 communicates with a customer information database 140. In some embodiments, the customer information database 140 may be configured to store information associated with customers of the retailer who order products 190 from the retailer. In some embodiments, the customer information database 140 may store electronic information including but not limited to: personal information of the customers, including payment method information, billing address, previous delivery addresses, phone number, product order history, pending order status, product order options, product delivery options (e.g., delivery by UTV) of the customer, as well as any intermediate communication devices 125 registered to and/or made available to the system 100 by the customer. The customer information database 140 may be stored, for example, on non-volatile storage media (e.g., a hard drive, flash drive, or removable optical disk) internal or external to the order processing server 130, or internal or external to computing devices separate and distinct from the order processing server 130. It will be appreciated that the customer information database 140 may be cloud-based.

In the embodiment of FIG. 1, the order processing server 130 is in communication with an electronic database 160 configured to store information associated with the inventory of products 190 made available by the retailer to the customer and/or the products 190 that have been ordered by the customers and/or being delivered to the customers via the UTVs 110, as well as information associated with the UTVs 110 being deployed to deliver the products 190 to the intended destinations 180 specified by the customers. In some aspects, the electronic database 160 stores information including but not limited to: route data indicating the predetermined mission routes of the UTVs 110, bandwidth data indicating predicted and/or actual bandwidth available to the UTVs 110 during their travel along the predetermined mission routes, weather data indicating predicted and/or actual weather during the travel of the UTVs 110 along the predetermined mission routes 120, information associated with the products 190 being transported by the UTVs 110; inventory (e.g., on-hand, replenishment, sold, in-transit, etc.) information associated with the products 190; information associated with the UTVs 110 and the intermediate communication devices (ICDs) 125 available to facilitate communication between the computing device 150 and the UTVs 110; status input information detected by one or more sensors of the UTVs 110 during movement of the UTVs 110 along the mission routes 120; global positioning system (GPS) coordinates of the UTVs 110 and ICDs 125; and control signals and/or instructions transmitted over the network 115 between the computing device 150, UTVs 110, and/or ICDs 125.

The electronic database 160 may be stored, for example, on non-volatile storage media (e.g., a hard drive, flash drive, or removable optical disk) internal or external to the order processing server 130, or internal or external to computing devices separate and distinct from the order processing server 130. The electronic database 160 may likewise be cloud-based. While the customer information database 140 and the electronic database 160 are shown in FIG. 1 as two separate databases, it will be appreciated that the customer information database 140 and the electronic database 160 can be incorporated into one database.

With reference to FIG. 1, the computing device 150 may be in the form of one or more stationary or portable electronic devices, for example, desktop computers, laptop computers, tablets, mobile phones, or any other electronic devices including a processor-based control circuit (i.e., control unit). In this specification, the term "computing device" will be understood to refer to one or more computing devices owned by the retailer or owned and/or operated by an entity (e.g., delivery service) having an obligation to transport products 190 for the retailer. The computing device 150 of FIG. 1 is configured for data entry and processing and for communication with other devices of system 100 via the network 115. In some embodiments, as will be described below, the computing device 150 is configured to access the electronic database 160 and/or customer information database 140 via the network 115 to facilitate delivery of products 190 via UTVs 110 along mission routes 120 to intended destinations 180, and to facilitate continuous and uninterrupted communication between the UTVs 110 moving along their predetermined mission routes 120 and between such UTVs 110 and the computing device 150.

In the system 100 shown in FIG. 1, the computing device 150 is in two-way communication with the UTV 110 via the network 115. When the UTV 110 and the computing device 150 have an active and workable communication link via the network 115, the computing device 150 is permitted to transmit signals (e.g., via communication channel 135) directly to the UTV 110 and to receive signals directly (e.g., via communication channel 135) from the UTV 110 over the network 115. In the exemplary embodiment depicted in FIG. 1, when the UTV 110 is in a location, where the communication channel 135 is undermined (e.g., due to bandwidth congestion, weather interference, etc.) such that the computing device 150 is unable to transmit signals to/receive signals directly from the UTV 110 over the network 115, the system 100 is configured such that an intermediate communication device (ICD) 125 is identified that is able to act as an active relay (e.g., via the communication channels 145 and 155) to enable the computing device 150 to transmit signals to the UTV 110 and receive signals from the UTV 110 over the network 115 via the ICD 125 even when the UTV 110 is in the location, where the UTV 110 is unable to directly communicate over the network 115 with the computing device 150. In other words, in the embodiment illustrated in FIG. 1, when a UTV 110 is located in a location where the UTV 110 has a signal that is too weak to enable the UTV 110 to communicate with the computing device 150 directly via the communication channel 135, the ICD 125 enables the computing device 150 to transmit (e.g., via the communication channel 145) communication signals to (and receive signals from) directly to (and from) the ICD 125, and the ICD 125 in turn relays such signals (e.g., the via communication channel 155) to (and from) the UTV 110 that is located in an area where the network 115 is congested or in an area of inclement weather such that direct UTV 110-computing device 150 communications are interfered with and/or are prevented.

In some aspects, the computing device 150 is configured to transmit at least one signal to the UTV 110 to cause the UTV 110 to travel along a mission route 120 (determined by the computing device 150) while transporting products 190 from the UTV deployment station 185 to the intended destination 180 (e.g., to drop off a product 190 or to pick up a product 190), or while returning from the intended destination 180 to the UTV deployment station 185 (e.g., after dropping off or after picking up a product 190). In other aspects, after a customer places an on order for one or more products 190 and specifies an intended destination 180 for the products 190 via the order processing server 130, prior to and/or after the commencement of a delivery attempt of the products 190 ordered by the customer via a UTV 110 to the intended destination 180, the computing device 150 is configured to obtain GPS coordinates associated with the intended destination 180 selected by the customer and GPS coordinates associated with the UTV deployment station 185 of the retailer (which houses the UTV 110 that will deliver the products 190), and to determine a mission route 120 for the UTV 110 in order to deliver the customer-ordered products 190 from the UTV deployment station 185 to the intended destination 180. In one aspect, the determined mission route 120 may simply be the route having a shortest distance. In some embodiments, the computing device 150 is configured to evaluate a communication usability map including the determined mission route 120 and determine that at one or more points along the mission route 120, the UTV 110 will be out of communication with the computing device 150 via the network 115 (due to, for example, sufficient bandwidth availability, inclement weather conditions, etc.) and, based on such a determination, to identify an ICD 125 that would enable continuous and uninterrupted communication between the computing device 150 and the UTV 110 and to facilitate communication between the computing device 150 and the UTV 110 via the identified ICD 125 when the UTV 110 is traveling along a portion of the mission route 120, where direct UTV 110-computing device 150 communication is not feasible. In some aspects, the computing device 150 is configured to not just identify an ICD 125, but to also reroute the UTV 110 from its mission route 120 to avoid the so-called communication hole and enable the UTV 110 to remain in communication with the computing device 150 either directly, or via an ICD 125.

Figure 3:
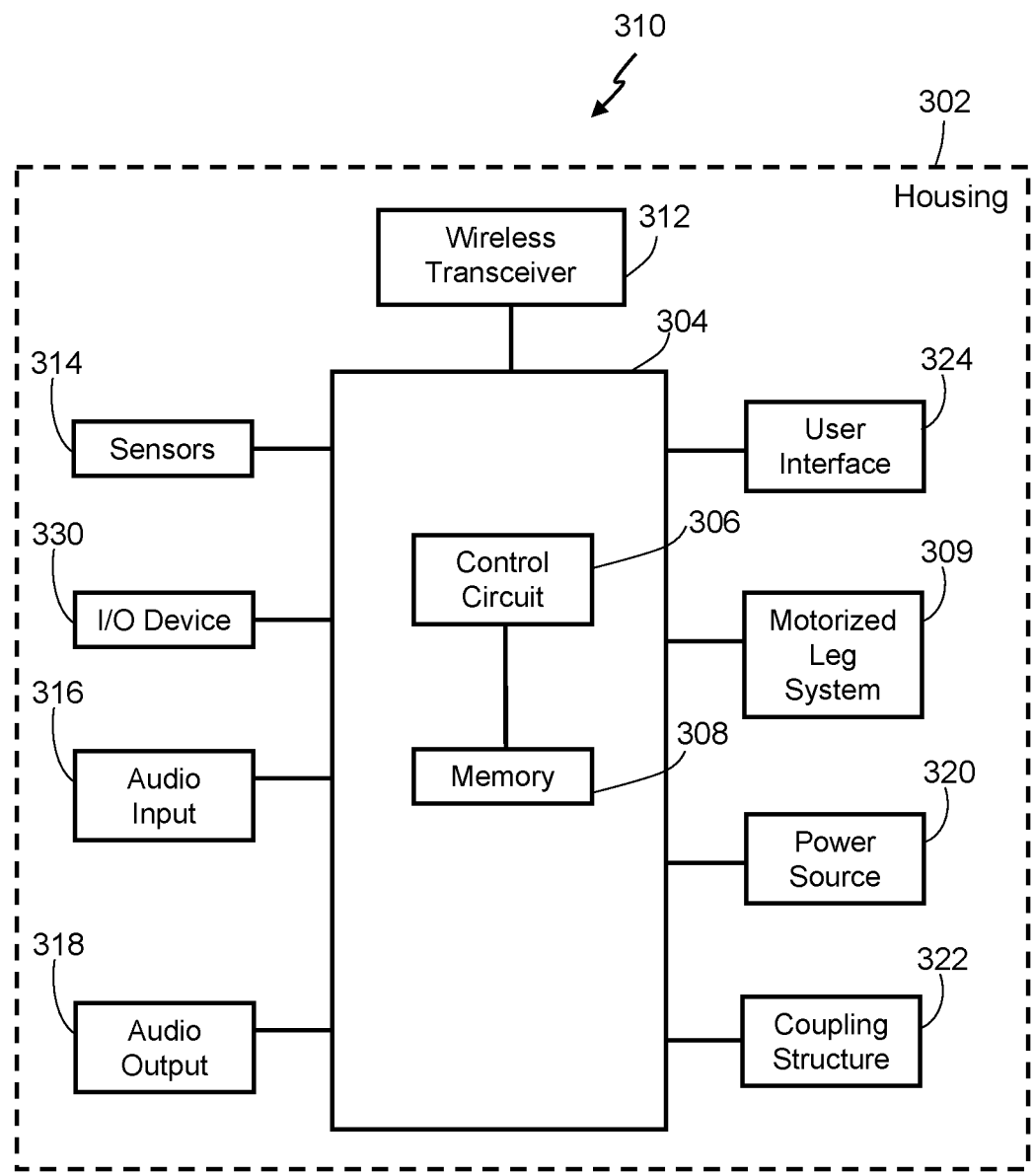
FIG. 3 comprises a block diagram of an unmanned transport vehicle (UTV) as configured in accordance with some embodiments.

The UTV 110, which will be discussed in more detail below with reference to FIG. 3, is generally an unmanned vehicle (e.g., an unmanned aerial vehicle (UAV) or autonomous ground vehicle (AGV)) configured to autonomously traverse one or more intended environments in accordance with one or more mission routes 120 determined by the computing device 150, and typically without the intervention of a human or a remote computing device, while retaining the products 190 therein and delivering the products 190 to the intended destination 180. In some instances, however, a remote operator or a remote computer (e.g., computing device 150) may temporarily or permanently take over operation of the UTV 110 using feedback information (e.g., audio and/or video content, sensor information, etc.) communicated from the UTV 110 to the remote operator or computer via the network 115, or another similar distributed network. In other words, while the present application refers to the UTV 110 as being "unmanned," in some embodiments, the UTV 110 is a human operator-controlled vehicle. While only one UTV 110 is shown in FIG. 1 for ease of illustration, it will be appreciated that in some embodiments, the computing device 150 may communicate (directly over the network 115 or via one or more ICDs 125) with, and/or provide mission route instructions to more than one (e.g., 5, 10, 20, 50, 100, 1000, or more) UTVs 110 simultaneously to guide the UTVs 110 to transport products 190 to their respective intended destinations 180.

In some embodiments, as will be discussed in more detail below, the UTV 110 is equipped with one or more sensors configured to detect and transmit (e.g., internally to the UTV 110 and/or over the network 115) at least one status input (e.g., present location of the UTV 110, real-time weather at the present location of the UTV 110, quality of the wireless communication network at the present location of the UTV 110, proximity of other UTVs 110 to the present location of the UTV 110, etc.) associated with the UTV 110 during movement of the UTV 110 along the mission route 120. In addition, in some aspects, the UTV 110 includes a processor-based control circuit configured to analyze the status input (e.g., route data associated with the UTVs 110 in view of the bandwidth data and the weather data) and determine whether the UTV 110 will be out of direct communication with the computing device 150 when traveling along one or more segments of the predetermined mission route 120, as well as to generate and transmit an electronic signal (e.g., an alert) indicative of this determination over the network 115 to the computing device 150 and/or ICD 125.

With reference to FIG. 1, the ICD 125 can include but is not limited to one or more UTVs 110 (e.g., unmanned aerial vehicles, autonomous ground vehicles, etc.), manned ground vehicles, manned aerial vehicles, stationary antenna arrays and/or movable antennas, WiFi networks (e.g., retailer-owned/operated or owned/operated by a $3^{rd}$ party), way stations, retailer-operated or $3^{rd}$ party-operated mobile communication stations mounted on trucks, cars, boats, etc., customer or $3^{rd}$ party wireless communication devices, and combinations thereof. In other words, the ICD 125 may be an "unmanned" device or vehicle, or a human-operated device or vehicle, and may be mobile or stationery. In some aspects, the ICD 125 is configured to communicate with the computing device 150 over the network 115 via the communication channel 145 and to communicate with the UTV 110 via the communication channel 155, which enables the ICD 125 to relay signals transmitted by the computing device 150 to a UTV 110 located in a location where the wireless signal quality would not permit direct communication between the UTV 110 and the computing device 150. It will be appreciated that the ICD 125 may likewise relay to the UTV 110, via the communication channel 155, the signals transmitted from the electronic database 160 and/or the order processing server 130, and to relay to the electronic database 160 and/or order processing server 130 the signals transmitted by the UTV 110.

It will be appreciated that the ICD 125 is configured to perform more functions than simply relaying signals between the UTV 110 and the computing device 150. For example, in some embodiments, the ICD 125 is configured to perform various functions, which will be described in more detail below, and which include but are not limited to: receiving sensor input (e.g., GPS data, still images, videos, etc.) from the UTV 110, tracking the location of the UTV 110, rerouting the UTV 110, detecting presence of electronic devices that may disrupt the functions and/or communication ability of the ICD 125 and/or the UTV 110, and authenticating electronic devices that attempt to communicate with the ICD 125 and/or UTV 110.

Figure 2:
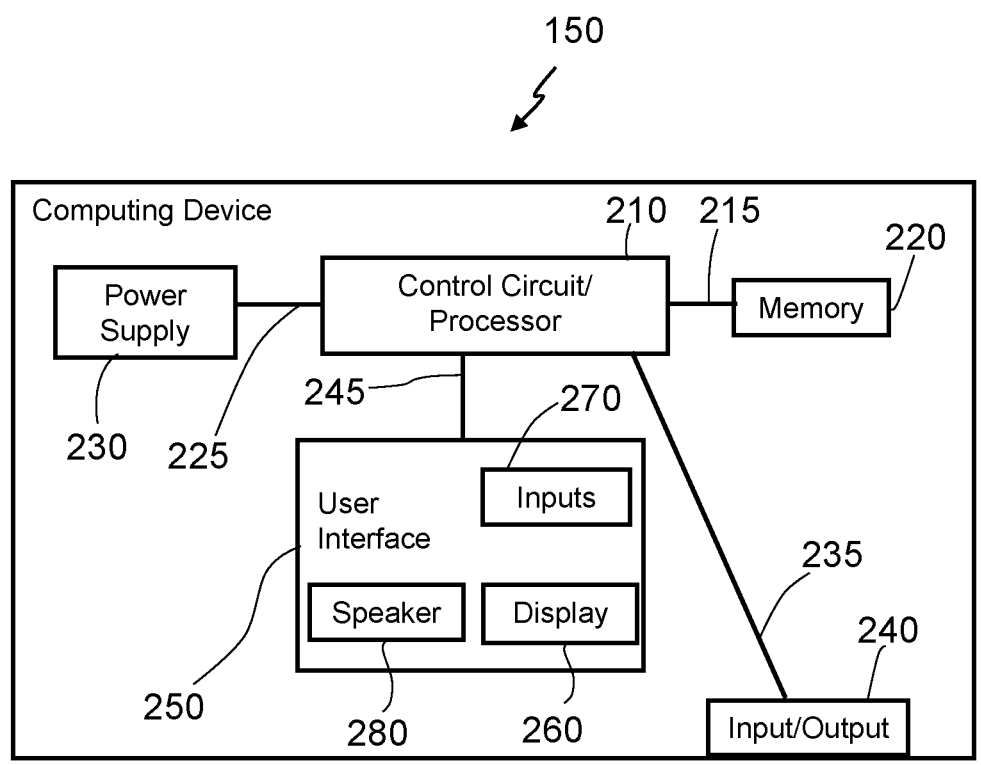
FIG. 2 is a functional diagram of an exemplary computing device usable with the system of FIG. 1 in accordance with some embodiments.

With reference to FIG. 2, an exemplary computing device 150 configured for use with the systems and methods described herein may include a control unit or control circuit 210 including a processor (for example, a microprocessor or a microcontroller) electrically coupled via a connection 215 to a memory 220 and via a connection 225 to a power supply 230. The control circuit 210 can comprise a fixed-purpose hard-wired platform or can comprise a partially or wholly programmable platform, such as a microcontroller, an application specification integrated circuit, a field programmable gate array, and so on. These architectural options are well known and understood in the art and require no further description here.

The control circuit 210 of the computing device 150 can be configured (for example, by using corresponding programming stored in the memory 220 as will be well understood by those skilled in the art) to carry out one or more of the steps, actions, and/or functions described herein. In some embodiments, the memory 220 may be integral to the processor-based control circuit 210 or can be physically discrete (in whole or in part) from the control circuit 210 and is configured non-transitorily store the computer instructions that, when executed by the control circuit 210, cause the control circuit 210 to behave as described herein. (As used herein, this reference to "non-transitorily" will be understood to refer to a non-ephemeral state for the stored contents (and hence excludes when the stored contents merely constitute signals or waves) rather than volatility of the storage media itself and hence includes both non-volatile memory (such as read-only memory (ROM)) as well as volatile memory (such as an erasable programmable read-only memory (EPROM))). Thus, the memory and/or the control circuit may be referred to as a non-transitory medium or non-transitory computer readable medium.

The control circuit 210 of the computing device 150 is also electrically coupled via a connection 235 to an input/output 240 that can receive signals from the UTV 110 and/or ICD 125 and/or order processing server 130 and/or customer information database 140 and/or electronic database 160. For example, the computing device 150 can receive signals including but not limited to: sensor data (e.g., communication capability status, communication network quality, weather data, etc.) from the UTV 110 (or ICD 125) representing at least one status input associated with the UTV 110 during movement of the UTV 110 along the mission route 120, data from the order processing server 130 and/or customer information database 140 and/or electronic database 160 relating to an order for a product 190 placed by the customer, location data (e.g., GPS coordinates) associated with the UTV 110 and/or ICD 125 and/or intended destination 180 selected by the customer, or from any other source that can communicate with the computing device 150 via a wired or wireless connection. The input/output 240 of the computing device 150 can also send signals to the UTV 110 (e.g., a control signal indicating a mission route 120 determined by the computing device 150 for the UTV 110 in order to transport the product 190 from the UTV deployment station 185 to the intended destination 180). The input/output 240 of the computing device 150 can also send signals to the order processing server 130 (e.g., notification indicating that the UTV 110 successfully delivered the product 190 to the intended destination 180).

In the embodiment of FIG. 2, the processor-based control circuit 210 of the computing device 150 is electrically coupled via a connection 245 to a user interface 250, which may include a visual display or display screen 260 (e.g., LED screen) and/or button input 270 and/or a speaker 280 that provide the user interface 250 with the ability to permit an operator of the computing device 150 to manually control the computing device 150 by inputting commands via touch-screen and/or button operation and/or voice commands to, for example, to transmit a control signal to the UTV 110 in order to provide the UTV 110 with the mission route 120 from the UTV deployment station 185 to the intended destination 180, to transmit wireless signals directly to the UTV 110 provided that the UTV 110 is in a location where the quality of the network 115 permits such direct communications, and/or to transmit wireless signals to the UTV 110 via the ICD 125 when the UTV 110 is in location where the quality of the network 115 is reduced and/or otherwise disrupted by network congestion, weather, network jamming devices, etc. It will be appreciated that the performance of such functions by the control circuit 210 of the computing device 150 is not dependent on a human operator, and that the control circuit 210 may be programmed to perform such functions without a human operator.

In some aspects, the display screen 260 of the computing device 150 is configured to display various graphical interface-based menus, options, and/or alerts that may be transmitted to the computing device 150 and displayed on the display screen 260 in connection with various aspects of the delivery of the products 190 ordered by the customers by the UTVs 110, various aspects of monitoring the communication capabilities UTVs 110 while they are in-route, and various aspects of communicating with the UTVs 110 via the ICDs 125 to enable the UTVs 110 to be in continuous and uninterrupted communication with the computing device 150 while the UTVs 110 perform their missions along the routes 120. The inputs 270 of the computing device 150 may be configured, for example, to permit an operator to navigate through the on-screen menus on the computing device 150, to change and/or update the mission route 120 of the UTV 110 toward or away from the intended destination 180 and/or to reroute a UTV 110 from the mission route 120 (e.g., to avoid an obstacle or a no-fly zone or a communication hole, or to move towards a stationery or mobile ICD 125 selected by the computing device 150 to be the relay between the UTV 110 and the computing device 150). It will be appreciated that the display screen 260 may be configured as both a display screen and an input 270 (e.g., a touch-screen that permits an operator to press on the display screen 260 to enter text and/or execute commands.)

In some embodiments, after an order for one or more products 190 is placed by a customer via the order processing server 130, and prior to commencement of the delivery attempt of one or more products 190 via the UTV 110 to the intended destination 180 designated by the customer, the control circuit 210 of the computing device 150 is programmed to obtain the GPS coordinates of the intended destination 180 where the product 190 is to be delivered by the UTV 110. For example, in embodiments, where the customer requested delivery of a product 190 or products 190 to an intended destination 180 associated with a specific geographic location (e.g., home address, work address, etc.), the control circuit 210 of the computing device 150 obtains the GPS coordinates associated with the intended destination 180, for example, from the customer information database 140, or from another source configured to provide GPS coordinates associated with a given physical address.

In some embodiments, the control circuit 210 of the computing device 150 is configured to analyze the GPS coordinates of both the UTV deployment station 185 and the intended destination 180, and to determine and generate a mission route 120 for the UTV 110. In one aspect, the mission route 120 determined by the computing device 150 is based on a starting location of the UTV 110 (e.g., a UTV deployment station 185) and the intended destination 180 of the UTV 110 where the UTV may drop off products 190 or pick up return products 190, and represents the shortest distance between the starting location of the UTV 110 and the intended destination 180. In some aspects, the computing device 150 is configured to calculate multiple possible mission routes 120 for the UTV 110, and then select a mission route 120 determined by the computing device 150 to provide an optimal delivery time and/or conditions while traveling (in-air or on-ground) along the original mission route 120. In some embodiments, after the control circuit 210 of the computing device 150 determines and generates a mission route 120 for the UTV 110, the computing device 150 transmits, via the output 240 and over the network 115, a signal including the mission route 120 to the UTV 110 assigned to deliver one or more products 190 from the UTV deployment station 185 to the intended destination 180.

In some embodiments, the computing device 150 is capable of integrating 2D and 3D maps of the navigable space of the UTV 110 along the mission route 120 determined by the computing device 150, complete with topography data comprising: no fly zones and/or physical obstructions along the mission route 120, as well as on-ground buildings, hills, bodies of water, power lines, roads, vehicles, people, and/or known communication holes for the UTV 110 along the mission route 120. After the computing device 150 maps all in-air and on-ground objects along the mission route 120 of the UTV 110 to specific locations using algorithms, measurements, and GPS geo-location, for example, grids may be applied sectioning off the maps into access ways and blocked sections, enabling the UTV 110 to use such grids for navigation and recognition. The grids may be applied to 2D horizontal maps along with 3D models. Such grids may start at a higher unit level and then can be broken down into smaller units of measure by the computing device 150 when needed to provide more accuracy.

In some embodiments, the computing device 150 is configured to analyze the mission routes 120 of the UTV 110 to determine that the mission route 120 from the UTV deployment station 185 to the intended destination 180 or vice versa will cause the UTV 110 to travel through one or more areas (i.e., segments of the mission route 120) where the UTV 110 will be out of direct communication with the computing device 150, for example, due to expected inclement weather, or expected network congestion and/or significant reduction in available bandwidth (due to, for example, too many UTVs 110 being present in one area at a given time, network outages, etc.). In one aspect, the control circuit 210 of the computing device 150 is configured to obtain, from the electronic database 160 and over the network 115, electronic data indicating a list of ICDs 125 available to provide relay communications between the computing device 150 and the UTV 110 when the UTV 110 is traveling along the segment(s) of the predetermined mission route where the UTV 110 is out of direct communication with the computing device 150, and to select an ICD 125 for providing relay communications between the UTV 110 and the ICD 125.

In some aspects, the computing device 150 is further configured to transmit a signal to the UTV 110 indicating that the UTV 110 is to transmit signals to an ICD 125 identified in the signal (and selected by the computing device 150) when the UTV 110 is traveling along the segment of the mission route 120 determined to be associated with expected wireless signal degradation, wireless network congestion and/or unavailability etc. In one aspect, the computing device 150 is configured to transmit an alert signal to the UTV 110 over the network 115 indicating that the UTV 110 is about to enter a segment of the mission route 120, where the conditions of the network 115 are such that direct communication between the computing device 150 and the UTV 110 will not be feasible. Then, in some aspects, the computing device 150 is configured to also transmit a signal to a ICD 125 (which may be selected by the computing device 150 or by the UTV 110 itself) identifying the UTV 110 that will be experiencing wireless communication difficulties, and instructing the ICD 125 to relay signals between the identified UTV 110 and the computing device 150 when the UTV 110 is traveling along a portion of the mission route 120 where direct communication between the UTV 110 and the computing device 150 is not permitted by the conditions of the network 115. In some embodiments, the computing device 150 is configured to instruct the UTV 110 and the ICD 125 as to which communication type (e.g., LTE, RF, etc.) to use, as well as to control the rate of communications between the UTV 110 and the ICD 125 (e.g., by specifying that burst communications are used and/or specifying a given flow rate, etc.)

In some aspects, while the UTV 110 is traveling from the UTV deployment station 185 toward the intended destination 180 along the mission route 120, the computing device 150 is configured to continuously or at regular intervals (e.g., 30 seconds, 1 minute, 5 minutes, 15 minutes, etc.) receive from the UTV 110 one or more sensor inputs such as current physical location of the UTV 110 and/or real time conditions of the communication network 115 at the current physical location of the UTV 110. Such sensor inputs may be received by the computing device 150 directly from the UTV 110 or indirectly (e.g., via the electronic database 160) over the network 115, and directly from the UTV 110 (when the UTV 110 is located in an area where the quality of the network 115 is sufficient) or indirectly via the ICD 125 (when the UTV 110 is located in an area where the communication network 115 is subject to signal degradation due to congestion, weather, or any other reasons).

In certain aspects, the electronic database 160 stores electronic data indicating each of the ICDs 125 available to communicate with and/or control a given UTV 110 when the UTV 110 is traveling along a segment of the mission route 120, where the communication network 115 is subject to signal degradation due to congestion, weather, etc. such that direct communications between the UTV 110 and computing device 150 are in effect prevented. In one aspect, as mentioned above, the computing device 150 obtains such data from the electronic database 160 over the network 115 and analyzes the data obtained from the electronic database 160 to select, from the ICDs 125 listed in the electronic database 160, an ICD 125 relaying signals between the UTV 110 and the computing device 150 when the UTV 110 is traveling along a segment of the mission route 120, where direct communications between the UTV 110 and computing device 150 are prevented. In some embodiments, the computing device 150 is configured to guide the UTV 110 and the ICD 125 toward each other. To that end, in some aspects, the computing device 150 is configured to determine GPS coordinates of the UTV 110 and the ICD 125, and to generate a guiding signal that facilitates the travel of the UTV 110 toward the ICD 125 and vice versa.

FIG. 3 presents a more detailed exemplary embodiment of the UTV 110 of FIG. 1. In this example, the UTV 310 has a housing 302 that contains (partially or fully) or at least supports and carries a number of components. These components include a control unit 304 comprising a control circuit 306 that controls the general operations of the UTV 310. The control unit 304 includes a memory 308 coupled to the control circuit 306 for storing data such as operating instructions and/or useful data.

In some embodiments, the control circuit 306 operably couples to a motorized leg system 309. This motorized leg system 309 functions as a locomotion system to permit the UTV 310 to land onto the ground or onto a landing pad at the intended destination 180 and/or to move on the ground toward the intended destination 180 from a UTV deployment station 185 and vice versa. Various examples of motorized leg systems are known in the art. Further elaboration in these regards is not provided here for the sake of brevity save to note that the control circuit 306 may be configured to control the various operating states of the motorized leg system 309 to thereby control when and how the motorized leg system 309 operates.

In the embodiment of FIG. 3, the control circuit 306 operably couples to at least one wireless transceiver 312 that is configured as a two-way transceiver and operates according to any known wireless protocol. This wireless transceiver 312 can comprise, for example, a cellular-compatible, Wi-Fi-compatible, and/or Bluetooth-compatible transceiver that can wirelessly communicate with the computing device 150 via the network 115 and/or with the ICD 125 via the communication channel 155. These teachings will accommodate using any of a wide variety of wireless technologies as desired and/or as may be appropriate in a given application setting. These teachings will also accommodate employing two or more wireless transceivers 312. So configured, the control circuit 306 of the UTV 310 can provide information (e.g., sensor input) to the computing device 150 and/or ICD 125 and receive information and/or movement (e.g., routing and rerouting) instructions from the computing device 150 and/or ICD 125. In some aspects, the UTV 310 is configured to obtain location data (e.g., GPS coordinates) indicating a present location of one or more ICDs 125 stored in the electronic database 160 or otherwise detected by the UTV 310, and the control circuit 306 of the UTV 310 is programmed to analyze such obtained location data to identify the ICD 125 that is located closest to the UTV 310 when the UTV 310 is located at (or approaching) one or more segments (i.e., communication holes) of the mission route 120 where the UTV 310 is out of direct communication with the computing device 150.

In some embodiments the control circuit 306 of the UTV 310 controls the devices that may communicate with the UTV 310 via the wireless transceiver 312. For example, in some aspects, the control circuit 306 of the UTV 310 is configured to authenticate the ICD 125 attempting to communicate with the UTV 310 and permit the ICD 125 to communicate with the UTV 310 only after the ICD 125 transmits an authenticated electronic access key to the UTV 310. Similarly, in some aspects, the computing device 150 is configured to authenticate the ICD 125 attempting to communicate with the computing device 150 and to permit the ICD 125 to communicate with the computing device 150 only after the ICD 125 transmits an authenticated electronic access key to the computing device 150.

In some embodiments, the wireless transceiver 312 is configured to receive a signal containing instructions including the mission route 120 and/or instructions for guiding the in-air and/or on-ground movements of the UTV 110 transmitted from the computing device 150 and/or the ICD 125, and that can transmit one or more signals (e.g., including sensor input information detected by one or more sensors of the UTV 110) to the computing device 150 and/or the ICD 125. For example, the control circuit 306 of the UTV 310 can receive control signals from the computing device 150 (directly or via the ICD 125) over the network 115 containing instructions regarding directional movement of the UTV 310 along a specific, computing device-determined mission route 120 when, for example, flying from the UTV deployment station 185 to the intended destination 180 to drop off and/or pick up a product 190 or returning from the intended destination 180 after dropping off or picking up a product 190 to the UTV deployment station 185. In some aspects, the UTV 310 transmits over the network 115 and via the transceiver 312, an alert signal to the computing device 150 and/or ICD 125 indicating that the UTV 110 is about to enter a segment of the mission route 120, where the communication network 115 is subject to signal degradation due to congestion, weather, etc. such that direct communications between the UTV 110 and computing device 150 are not possible.

In particular, as discussed above, the computing device 150 can be configured to analyze GPS coordinates of the intended destination 180 designated by the customer, determine a mission route 120 for the UTV 110 to the intended destination 180, and transmit to the wireless transceiver 312 of the UTV 110 a first control signal including the mission route 120 over the network 115. The UTV 110, after receipt of the first control signal and/or guiding signal from the computing device 150 over the network 115 via the wireless transceiver 312, is configured to navigate, based on the route instructions in the control signal and/or guiding signal, to the intended destination 180 and/or to the ICD 125 and/or to the UTV deployment station 185.

With reference to FIG. 3, the control circuit 306 of the UTV 310 also couples to one or more on-board sensors 314 of the UTV 310. These teachings will accommodate a wide variety of sensor technologies and form factors. In some embodiments, the on-board sensors 314 can comprise any relevant device that detects and/or transmits at least one status of the UTV 310 during travel of the UTV 110 along the mission route 120. The sensors 314 of the UTV 310 can include but are not limited to: altimeter, velocimeter, thermometer, GPS data, photocell, battery life sensor, video camera, radar, lidar, laser range finder, sonar, electronics status, and communication status. In some embodiments, the information obtained by the sensors 314 of the UTV 310 is used by the UTV 310 and/or the computing device 150 and/or the ICD 125 in functions including but not limited to: navigation, landing, on-the-ground object detection, potential in-air object detection, distance measurements, topography mapping.

In some aspects, the status input detected and/or transmitted by one or more sensors 314 of the UTV 310 includes but is not limited to GPS coordinates of the UTV 310, marker beacon data along the mission route 120, and way point data along the mission route 120. In one embodiments, the UTV 310 includes at least one sensor 314 configured to detect a present location of the UTV 310 along the mission route 120, at least one sensor 314 configured to detect real-time weather at the present location of the UTV 110, at least one sensor 314 configured to detect a quality of the wireless communication network 115 at the present location of the UTV 110, and at least one sensor 314 configured to detect a proximity to the at least one UTV 110 of one or more other UTVs 110 and/or one or more ICDs 125. In some embodiments, as mentioned above, such status/sensor input data enables the control circuit 306 of the UTV 110 and/or the control circuit 210 of the computing device 150 and/or the control circuit of the ICD 125 (when obtained by the computing device 150 and/or the ICD 125 (either from the UTV 110 or from the electronic database 160)), based on an analysis of at least such status/sensor input data, to determine a suitable ICD 125 for acting as a relay between the UTV 110 and the computing device 150 when the UTV 110 travels along a segment of the mission route 120, where the communication network 115 is subject to signal degradation due to congestion, weather, etc. such that direct communications between the UTV 110 and computing device 150 are not possible.

In some embodiments, the control circuit 306 of the UTV 310 is configured to analyze electronic (e.g., route) data associated with the travel of the UTV 310 along a given mission route 120 in view of bandwidth data and weather data, which may be detected by the sensors 314 of the UTV 310, or obtained by the UTV 310 from the electronic database 160, to determine if the UTV 310 will be out of direct communication with the computing device 150 when traveling along one or more segments of the mission route 120. In some aspects, in response to a determination by the control circuit 306 of the UTV 310 that the UTV 310 will be out of direct communication with the computing device 150 when traveling along the one or more segments of the predetermined mission route 120, identify an ICD 125 configured to relay communications between the computing device 150 and the UTV 310 (e.g., via communication channels 145 and 155) when the UTV 310 is traveling along such segments of the mission route 120.

In some embodiments, the control circuit 306 of the UTV 310 is configured to obtain, from the electronic database 160 and over the wireless communication network 115, electronic data indicating a list of ICDs 125 available to provide relay communications between the computing device 150 and the UTV 310 when the UTV 310 is traveling along one or more segments of the predetermined mission route 120 where the UTV 310 is out of direct communication with the computing device 150. In some aspects, the control circuit 306 of the UTV 310 is further configured to obtain and/or analyze: the coordinates of such segments of the predetermined mission route 120, the coordinates of the ICDs 125 on the list, the bandwidth data, and the weather data to determine an availability ranking and a cost ranking for each of the ICDs 125 on the availability list. In one aspect, the control circuit 306 of the UTV 310 is further configured to select the ICD 125 that is determined by the control circuit 306 to: (1) have a highest availability ranking, the highest availability ranking being based on a determination by the control circuit 306 that the selected ICD 125 would provide a strongest relay communication signal between the computing device 150 and the UTV 110 as compared to other ICDs 125 on the list; and (2) have a highest cost ranking, the highest cost ranking being based on a determination by the control circuit 306 that the selected ICD 125 is associated with a lowest cost of use as compared to other ICDs 125 on the list.

In one aspect, the control circuit 306 is further configured to transmit a control signal to the selected ICD 125 in order to identify (i.e., via the control signal) the UTV 310 for which the ICD 125 is to provide relay communications to and from the computing device 150 and, in some aspects, a period of time predetermined by the control circuit 306 during which relay communications are to be provided. In some embodiments, as will be discussed in more detail below, in response to receiving such a signal from the UTV 310, the ICD 125 is configured to actively relay communication signals between the computing device 150 and the UTV 310 either for a period of time defined in the signal received by the ICD 125 from the UTV 310 or the computing device 150, or until the control circuit 306 determines that the quality of the network 115 has been restored such that relay communications are no longer warranted, or until the ICD 125 receives a further signal indicating that the ICD 125 is to stop actively relaying the signals between the UTV 310 and the computing device 150.

In some embodiments, an audio input 316 (such as a microphone) and/or an audio output 318 (such as a speaker) can also operably couple to the control circuit 306 of the UTV 310. So configured, the control circuit 306 can provide for a variety of audible sounds to enable the UTV 310 to communicate with, for example, the computing device 150, ICD 125, other UTVs 310, or other in-air or ground-based electronic devices.

In the embodiment shown in FIG. 3, the UTV 310 includes a power source 320 such as one or more batteries. The power provided by the power source 320 can be made available to whichever components of the UTV 310 require electrical energy. By one approach, the UTV 310 includes a plug or other electrically conductive interface that the control circuit 306 can utilize to permit the UTV 310 to physically connect (e.g., via compatible plugs/adapter, magnetic cables, etc.) and/or remotely couple (via induction signals, etc.) to an external source of energy. In some aspects, the power source 320 is configured to be rechargable by induction (e.g., RF induction, light induction, laser induction, thermal induction, etc.).

These teachings will also accommodate optionally selectively and temporarily coupling the UTV 310 to another structure or electronic device (e.g., landing pad, deployment dock, etc.). In such aspects, the UTV 310 includes a coupling structure 322. By one approach such a coupling structure 322 operably couples to a control circuit 306 to thereby permit the latter to control movement of the UTV 310 (e.g., via hovering and/or via the motorized leg system 309) towards, for example, a landing location or a charging source, until the coupling structure 322 can engage the landing location or charging source to temporarily physically couple the UTV 310 to the landing location or charging source to drop off the product 190 or recharge the UTV 310.

The exemplary UTV 310 of FIG. 3 also includes a an input/output (I/O) device 330 that is coupled to the control circuit 306. The I/O device 330 allows an external device to couple to the control unit 304. The function and purpose of connecting devices will depend on the application. In some examples, devices connecting to the I/O device 330 may add functionality to the control unit 304, allow the exporting of data from the control unit 304, allow the diagnosing of the UTV 310, and so on.

The exemplary UTV 310 of FIG. 3 also includes a user interface 324 including for example, user inputs and/or user outputs or displays depending on the intended interaction with a user (e.g., a worker of a retailer, UTV delivery service, a customer, etc.). For example, user inputs could include any input device such as buttons, knobs, switches, touch sensitive surfaces or display screens, and so on. Example user outputs include lights, display screens, and so on. The user interface 324 may work together with or separate from any user interface implemented at an optional user interface unit (such as a smart phone or tablet device) usable by the worker.

In some embodiments, the UTV 310 may be controlled by a user in direct proximity to the UTV 310, for example, an operator of the UTV deployment station 185 (e.g., a driver of a moving vehicle), or by an unmanned or user-operated electronic device (e.g., computing device 150, ICD 125, etc.) at any location (e.g., regional or central hub) remote to the location of the UTV 310. This is due to the architecture of some embodiments where the computing device 150 and/or ICD 125 outputs control signals to the UTV 310. These controls signals can originate at any electronic device in communication with the computing device 150, for example, at the ICD 125. For example, the signals sent to the UTV 310 may be movement instructions determined by the computing device 150 and/or initially transmitted by a device of a user to the computing device 150 and in turn transmitted from the computing device 150 to the UTV 310 over the network 115 either directly or via an ICD 125.

The control unit 304 of the UTV 310 includes a memory 308 coupled to a control circuit 306 and storing data such as operating instructions and/or other data. The control circuit 306 can comprise a fixed-purpose hard-wired platform or can comprise a partially or wholly programmable platform. These architectural options are well known and understood in the art and require no further description. This control circuit 306 is configured (e.g., by using corresponding programming stored in the memory 308 as will be well understood by those skilled in the art) to carry out one or more of the steps, actions, and/or functions described herein. The memory 308 may be integral to the control circuit 306 or can be physically discrete (in whole or in part) from the control circuit 306 as desired. This memory 308 can also be local with respect to the control circuit 306 (where, for example, both share a common circuit board, chassis, power supply, and/or housing) or can be partially or wholly remote with respect to the control circuit 306. This memory 308 can serve, for example, to non-transitorily store the computer instructions that, when executed by the control circuit 306, cause the control circuit 306 to behave as described herein. It is noted that not all components illustrated in FIG. 3 are included in all embodiments of the UTV 310. That is, some components may be optional depending on the implementation.

FIG. 4 shows an embodiment of an exemplary method 400 of monitoring and controlling communication capabilities a plurality of UTVs 110. For exemplary purposes, the method 400 is described in the context of the system 100 of FIG. 1, but it is understood that embodiments of the method 400 may be implemented in this or other systems. The embodiment of the method 400 illustrated in FIG. 4 includes providing a plurality of UTVs 110 each including a processor-based control circuit and configured to transport commercial retail products 190 as well as goods not for sale along predetermined mission routes 120 (step 410). As discussed above, in some embodiments, each UTV 110 is configured to transport products 190 between a UTV deployment station 185 and an intended destination 180 along a mission route 120. In some aspects, each of the UTVs 110 includes at least one sensor configured to detect and/or transmit over the network 115 status data (e.g., weather data, network quality data, etc.) associated with the UTVs 110 during movement of the UTVs 110 along the mission route 120.

The exemplary method 400 of FIG. 4 further includes providing a computing device 150 including a processor-based control unit 210 and configured to communicate with one or more of the UTVs 110 via a wireless communication network 115 (step 420). As described in more detail above, the computing device 150 performs a variety of functions performed by the system 100. For example, in some embodiments, the computing device 150 is configured to generate mission routes 120 for the UTVs 110 based on analysis of the coordinates of the UTV deployment stations 185 and the intended destinations 180 of the UTVs 110, as well as to facilitate delivery of products 190 via the UTVs 110 to the intended destinations 180 along the predetermined mission routes 120 and to facilitate continuous and uninterrupted communications (e.g., via one or more ICDs 125) between the UTVs 110 moving along their predetermined mission routes 120 and between such UTVs 110 and the computing device 150. For example, in one aspect, as described above, when the UTV 110 is in a location, where the network 115 is undermined (e.g., due to bandwidth congestion, weather interference, etc.) such that the computing device 150 is unable to transmit signals to/receive signals directly from the UTV 110, the computing device 150 identifies an ICD 125 that can act as an active relay to enable the computing device 150 to transmit signals to the UTV 110 and receive signals from the UTV 110 over the network 115 via the ICD 125.

The exemplary method 400 further includes providing an electronic database 160 in communication over the wireless communication network 115 with the computing device 150 and one or more UTV 110 (step 430). As discussed above, in some embodiments, the electronic database 160 stores route data indicating the predetermined mission routes 120 of the UTVs 110, bandwidth data indicating bandwidth available to the UTVs 110 during their travel along the predetermined mission routes 120, and weather data indicating predicted weather during the travel of the UTVs 110 along the predetermined mission routes 120. As discussed above, in some aspects, the computing device 150 is configured to obtain such route data, bandwidth data, and/or weather data from the electronic database 160 over the network 115 (e.g., in order to determine a mission route 120 for the UTV 110 from the UTV deployment station 185 to the intended destination 180, to identify one or more possible communication holes for the UTV 110 as it travels along the mission route 120, and/or to determine an ICD 125 that may provide a suitable and most cost-effective relay for communications between the UTV 110 and the computing device 150 when the network 115 is degraded to a point, where direct communications between the UTV 110 and the computing device 150 are not possible or economically feasible.

In some embodiments, as discussed above, when the UTV 310 is traveling (in-air or on the ground) along the mission route 120 from the UTV deployment station 185 to the intended destination 180, the onboard sensors 314 of the UTV 310 monitor various parameters relating to the movement of the UTV 310 along the mission route 120 of the UTV 310 and the status of the UTV 310. In some aspects, the status input detected by the sensors 314 of the UTV 310 includes but is not limited to GPS coordinates of the UTV 310 indicating a present location of the UTV 310 along the mission route 120, real-time weather at the present location of the UTV 310, a quality of the wireless network 115 at the present location of the UTV 310, and a proximity to the UTV 310 of one or more other UTVs 110 and/or one or more ICDs 125.

While the status input data detected by the sensors 314 of the UTV 110 is expected to, in most cases, indicate that the movement of the UTV 110 along the mission route 120 is going as planned, in certain situations, the data detected by the sensors 314 of the UTV 310 may indicate that, along one or more segments of the mission route 120, the UTV 310 is going to be out of direct communication with the computing device 150 as a result of degradation and/or unavailability of network 115 (e.g., due to bandwidth congestion, inclement weather, etc.) to that end, the exemplary method 400 of FIG. 4 includes analyzing, via the control circuit 306 of the UTV 310, the route data associated with the UTV 310 in view of the bandwidth data and the weather data (obtained by and/or detected by the UTV 310) to determine whether the UTV 310 will be out of direct communication with the computing device 150 when traveling along one or more segments of the predetermined mission route 120 (step 440). In some aspects, after the control circuit 306 of the UTV 310 determines that the UTV 310 will, in fact, be will be out of direct communication with the computing device 150 when traveling along one or more segments of the predetermined mission route 120, the control circuit 306 of the UTV 310 transmits/broadcasts an alert signal (i.e., over the network 115) indicative of this determination to the computing device 150 and/or to the electronic database 116 and/or to one or more ICDs 125.

In some embodiments, after the control circuit 306 of the UTV 310 determines that the UTV 310 will be out of direct communication with the computing device 150 when traveling along one or more segments of the predetermined mission route 120, the control circuit 306 is able to identify an ICD 125 suitable as a relay to ensure continuous and uninterrupted communication between the UTV 310 and the computing device 150. To that end, the exemplary method 400 includes identifying, via the control circuit 306 of the UTV 310, an ICD 125 configured to relay communications between the computing device 150 and the UTV 310 when the UTV 310 is traveling along the one or more segments of the predetermined mission route 120 where the UTV 310 is out of direct communication with the computing device 150 (step 450).

In some embodiments, in order to arrive at a determination of which ICD 125 to select as the relay device, the control circuit 306 of the UTV 310 obtains, from the electronic database and over the wireless communication network 115, electronic data indicating a list of ICDs 125 available to provide relay communications between the computing device 150 and the UTV 310 when the UTV 110 is traveling along the one or more segments of the predetermined mission route 120 where the UTV 110 is out of direct communication with the computing device 150. In some aspects, after obtaining a list of available ICDs 125, the control circuit 306 of the UTV 310 is able to analyze the locations (e.g., GPS coordinates) of each of the ICDs 125, the bandwidth capabilities (i.e., signal strength) of each of the ICDs 125, and the weather data associated with each of the ICDs 125 in order to determine an availability ranking and a cost ranking for each of the ICDs 125 on the initially obtained ICD availability list. For example, as discussed above, in one aspect, the control circuit 306 of the UTV 310 selects a given ICD 125 on the availability list as the relay device based on a determination by the control circuit 306 that the ICD 125 has both the highest availability ranking (e.g., provides the strongest relay communication signal) and the highest cost ranking (e.g., lowest cost of use).

After the control circuit 306 of the UTV 310 selects an ICD 125 having the highest availability ranking as the relay device, the control circuit 306 provides an electronic notification to the selected ICD 125 over the network 115 and establish a communication link with the selected ICD 125. For example, in the embodiment illustrated in FIG. 4, the method 400 includes transmitting, via the control circuit 306 of the UTV 310, a control signal to the ICD 125, the control signal identifying the UTV 310 to the ICD 125 and instructing the ICD 125 to relay communication signals between the UTV 310 and the computing device 150 (step 460). After the ICD 125 receives this notification signal over the network 115 from the UTV 310, the exemplary method 400 of FIG. 4 includes permitting the UTV 310 to communicate with the computing device 150 via the ICD 125 while the at UTV 310 is traveling along one or more segments of the predetermined mission route 120 where the UTV 310 was determined by the control circuit 306 of the UTV 310 to be out of direct communication with the computing device 150 (step 470).

As described above, the ICD 325 selected by the UTV 310 to be a relay device fills in the expected communication holes of the UTV 310 as the UTV 310 travels along its mission routes 120 between the UTV deployment station 185 and the intended destination 180, and advantageously provides for the continuous monitoring and control of the UTV 310 via the computing device 150 even when the UTV 310 is located in an area where the communication network 115 is congested, degraded, or unavailable. In addition, the control circuit 306 of the UTV 310 according to some embodiments, is capable of both determining that the UTV 310 is going to be out of direct communication with the computing device 150 as a result of degradation and/or unavailability of network 115 and selecting a suitable ICD 125 to provide relay communication between the UTV 310 and the computing device 150 without having to rely on the computing device 150 to perform such analysis and make such decisions. Such capabilities of the UTV 310 advantageously reduce the processing power required of the control circuit 210 of the computing device 150, which otherwise would be tasked with both continuously monitoring the communication capabilities of 100, if not thousands of UTVs 310 and analyzing which ICD 125 (out of hundreds, if not thousands of possible choices) to select as the relay between a UTV 310 having network communication troubles and the computing device 150. In other words, in some embodiments, the system 100 is advantageously implemented as a decentralized system that may rely on block chain technology and that is not dependent on a single device to continuously monitor and correct the communication capabilities of each UTV 310 traveling along a mission route 120.

Those skilled in the art will recognize that a wide variety of other modifications, alterations, and combinations can also be made with respect to the above described embodiments without departing from the scope of the invention, and that such modifications, alterations, and combinations are to be viewed as being within the ambit of the inventive concept.

What is claimed is:

1. A system for monitoring and controlling communication capabilities of unmanned vehicles, the system comprising:
   the unmanned vehicles each including a processor-based control circuit and configured to transport goods along predetermined mission routes;
   a computing device including a processor-based control unit and configured to communicate with at least one of the unmanned vehicles via a wireless communication network;
   wherein the control circuit of the at least one of the unmanned vehicles is configured to:
   obtain electronic data indicating a list of intermediate communication devices available to provide relay communications between the computing device and the at least one of the unmanned vehicles when the at least one of the unmanned vehicles is traveling along one or more segments of a predetermined mission route from the predetermined mission routes of the at least one of the unmanned vehicles where the at least one of the unmanned vehicles is out of direct communication with the computing device;
   analyze coordinates of the one or more segments of the predetermined mission route of the at least one of the unmanned vehicles where the at least one of the unmanned vehicles is out of direct communication with the computing device, coordinates of the intermediate communication devices on the list, bandwidth data indicating bandwidth available to the at least one of the unmanned vehicles when the at least one of the unmanned vehicles is traveling along the one or more segments of the predetermined mission route of the at least one of the unmanned vehicles, a cost of use of each of the intermediate communication devices on the list, and weather data indicating weather associated with the one or more segments of the predetermined mission route of the at least one of the unmanned vehicles to generate an availability ranking and a cost ranking for each of the intermediate communication devices on the list; and select an intermediate communication device from the list determined by the control circuit of the at least one of the unmanned vehicles to have both:
- a highest availability ranking, the highest availability ranking being based on a determination by the control circuit of the at least one of the unmanned vehicles that the selected intermediate communication device would provide a strongest relay communication signal between the computing device and the at least one of the unmanned vehicles as compared to other intermediate communication devices on the list and
- a highest cost ranking, the highest cost ranking being based on a determination by the control circuit of the at least one of the unmanned vehicles that the selected intermediate communication device is associated with a lowest cost of use as compared to the other intermediate communication devices on the list; and transmit a control signal to the intermediate communication device selected by the control circuit, the control signal identifying the at least one of the unmanned vehicles to the intermediate communication device and instructing the intermediate communication device to relay communication signals between the computing device and the at least one of the unmanned vehicles;

wherein the intermediate communication device is configured, in response to a receipt of the control signal from the at least one of the unmanned vehicles, to relay the communication signals between the computing device and the at least one of the unmanned vehicles while the at least one of the unmanned vehicles is traveling along the one or more segments of the predetermined mission route of the at least one of the unmanned vehicles where the at least one of the unmanned vehicles is out of direct communication with the computing device.

2. The system of claim 1, wherein the unmanned vehicles are unmanned aerial vehicles.

3. The system of claim 1, wherein the unmanned vehicles are unmanned ground vehicles.

4. The system of claim 1, wherein the intermediate communication device comprises at least one of: another one of the unmanned vehicles, a third-party Wi-Fi network, a third-party unmanned vehicle, a third-party stationary wireless communication relay-enabled station, and a third-party mobile wireless communication relay-enabled station.

5. The system of claim 1, wherein the at least one of the unmanned vehicles includes at least one sensor configured to detect a present location of the at least one of the unmanned vehicles along the predetermined mission routes, at least one sensor configured to detect real-time weather at the present location, at least one sensor configured to detect a quality of the wireless communication network at the present location of the at least one of the unmanned vehicles along the predetermined mission routes, and at least one sensor configured to detect a proximity to the at least one of the unmanned vehicles of one or more of another unmanned vehicle and the intermediate communication device.

6. The system of claim 5, wherein each intermediate communication device includes at least one sensor configured to detect a present location of the intermediate communication device and wherein the control circuit of the at least one of the unmanned vehicles is further configured, based on location data obtained from the at least one sensor of the at least one of the unmanned vehicles and based on location data obtained from the at least one sensor of the intermediate communication device, to identify the intermediate communication device that is located closest to the at least one of the unmanned vehicles when the at least one of the unmanned vehicles is located at the one or more segments of the predetermined mission route where the at least one of the unmanned vehicles is out of direct communication with the computing device.

7. The system of claim 1, wherein the control circuit of the at least one of the unmanned vehicles is further configured to:
- authenticate the intermediate communication device attempting to communicate with the at least one of the unmanned vehicles; and
- permit the intermediate communication device to communicate with the at least one of the unmanned vehicles only after the intermediate communication device transmits an authenticated electronic access key to the at least one of the unmanned vehicles.

8. The system of claim 1, wherein the computing device is further configured to:
- authenticate the intermediate communication device attempting to communicate with the computing device; and
- permit the intermediate communication device to communicate with the computing device only after the intermediate communication device transmits an authenticated electronic access key to the computing device.

9. The system of claim 1, further comprising an electronic database in communication over the wireless communication network with the computing device and the at least one of the unmanned vehicles, the electronic database being configured to store data including at least one of:
- route data indicating the predetermined mission routes of the unmanned vehicles;
- bandwidth data indicating bandwidth available to the unmanned vehicles during their travel along the predetermined mission routes; and
- weather data indicating predicted weather during the travel of the unmanned vehicles along the predetermined mission routes.

10. The system of claim 1, wherein each of the unmanned vehicles includes a user interface including at least one input and at least one output that permit user interaction with a respective one of the unmanned vehicles.

11. A method for monitoring and controlling communication capabilities of unmanned vehicles, the method comprising:
- providing the unmanned vehicles each including a processor-based control circuit and configured to transport goods along predetermined mission routes;
- providing a computing device including a processor-based control unit and configured to communicate with at least one of the unmanned vehicles via a wireless communication network;
- obtaining, by the control circuit of the at least one of the unmanned vehicles, electronic data indicating a list of intermediate communication devices available to provide relay communications between the computing device and the at least one of the unmanned vehicles when the at least one of the unmanned vehicles is traveling along one or more segments of a predetermined mission route from the predetermined mission routes of the at least one of the unmanned vehicles where the at least one of the unmanned vehicles is out of direct communication with the computing device;

analyzing, by the control circuit of the at least one of the unmanned vehicles, coordinates of the one or more segments of the predetermined mission route of the at least one of the unmanned vehicles where the at least one of the unmanned vehicles is out of direct communication with the computing device, coordinates of the intermediate communication devices on the list, bandwidth data indicating bandwidth available to the at least one of the unmanned vehicles when the at least one of the unmanned vehicles is traveling along the one or more segments of the predetermined mission route of the at least one of the unmanned vehicles, a cost of use of each of the intermediate communication devices on the list, and weather data indicating weather associated with the one or more segments of the predetermined mission route of the at least one of the unmanned vehicles to generate an availability ranking and a cost ranking for each of the intermediate communication devices on the list; and selecting, by the control circuit of the at least one of the unmanned vehicles, an intermediate communication device from the list determined by the control circuit of the at least one of the unmanned vehicles to have both:
  a highest availability ranking, the highest availability ranking being based on a determination by the control circuit of the at least one of the unmanned vehicles that the selected intermediate communication device would provide a strongest relay communication signal between the computing device and the at least one of the unmanned vehicles as compared to other intermediate communication devices on the list; and
  a highest cost ranking, the highest cost ranking being based on a determination by the control circuit of the at least one of the unmanned vehicles that the selected intermediate communication device is associated with a lowest cost of use as compared to the other intermediate communication devices on the list; and transmitting, by the control circuit of the at least one of the unmanned vehicles, a control signal to the intermediate communication device selected by the control circuit, the control signal identifying the at least one of the unmanned vehicles to the intermediate communication device and instructing the intermediate communication device to relay communication signals between the computing device and the at least one of the unmanned vehicles;

in response to a receipt of the control signal from the at least one of the unmanned vehicles, relaying, by the intermediate communication device, the communication signals between the computing device and the at least one of the unmanned vehicles while the at least one of the unmanned vehicles is traveling along the one or more segments of the predetermined mission route of the at least one of the unmanned vehicles where the at least one of the unmanned vehicles is out of direct communication with the computing device.

12. The method of claim 11, wherein the unmanned vehicles are unmanned aerial vehicles.

13. The method of claim 11, wherein the unmanned vehicles are unmanned ground vehicles.

14. The method of claim 11, wherein the intermediate communication device comprises at least one of: another one of the unmanned vehicles, a third-party Wi-Fi network, a third-party unmanned vehicle, a third-party stationary wireless communication relay-enabled station, and a third-party mobile wireless communication relay-enabled station.

15. The method of claim 11, further comprising providing each of the unmanned vehicles with at least one sensor configured to detect a present location of the at least one of the unmanned vehicles along the predetermined mission routes, at least one sensor configured to detect real-time weather at the present location, at least one sensor configured to transmit over the wireless communication network a quality of the wireless communication network at the present location of the at least one of the unmanned vehicles along the predetermined mission routes, and at least one sensor detecting a proximity to the at least one of the unmanned vehicles of one or more of another unmanned vehicle and the intermediate communication device.

16. The method of claim 15, further comprising:
  providing each intermediate communication device with at least one sensor configured to transmit over the wireless communication network a present location of the intermediate communication device; and
  identifying, via the control circuit of the at least one of the unmanned vehicles and based on location data obtained from the at least one sensor of the at least one of the unmanned vehicles and based on location data obtained from the at least one sensor of the intermediate communication device, the intermediate communication device that is located closest to the at least one of the unmanned vehicles when the at least one of the unmanned vehicles is located at the one or more segments of the predetermined mission route where the at least one of the unmanned vehicles is out of direct communication with the computing device.

17. The method of claim 11, further comprising:
  authenticating, via the control circuit of the at least one of the unmanned vehicles, the intermediate communication device attempting to communicate with the at least one of the unmanned vehicles; and
  permitting, via the control circuit of the at least one of the unmanned vehicles, the intermediate communication device to communicate with the at least one of the unmanned vehicles only after the intermediate communication device transmits an authenticated electronic access key to the at least one of the unmanned vehicles.

18. The method of claim 11, further comprising:
  authenticating, via the control unit of the computing device, the intermediate communication device attempting to communicate with the computing device; and
  permitting the intermediate communication device to communicate with the computing device only after the intermediate communication device transmits an authenticated electronic access key to the computing device.

19. The method of claim 11, further comprising providing an electronic database in communication over the wireless communication network with the computing device and the at least one of the unmanned vehicles, the electronic database being configured to store data including at least one of:
  route data indicating the predetermined mission routes of the unmanned vehicles;
  bandwidth data indicating bandwidth available to the unmanned vehicles during their travel along the predetermined mission routes; and
  weather data indicating predicted weather during the travel of the unmanned vehicles along the predetermined mission routes.

20. The method of claim 11, further comprising providing each of the unmanned vehicles with a user interface including at least one input and at least one output that permit user interaction with a respective one of the unmanned vehicles.

* * * * *